Jan. 24, 1956  J. G. GIBSON  2,732,254
SPRAY ATTACHMENT FOR A CULTIVATOR

Filed July 30, 1954  2 Sheets-Sheet 1

INVENTOR.
JAMES G. GIBSON
BY
McMorrow, Berman & Davidson
ATTORNEYS

Jan. 24, 1956           J. G. GIBSON           2,732,254
SPRAY ATTACHMENT FOR A CULTIVATOR
Filed July 30, 1954           2 Sheets-Sheet 2
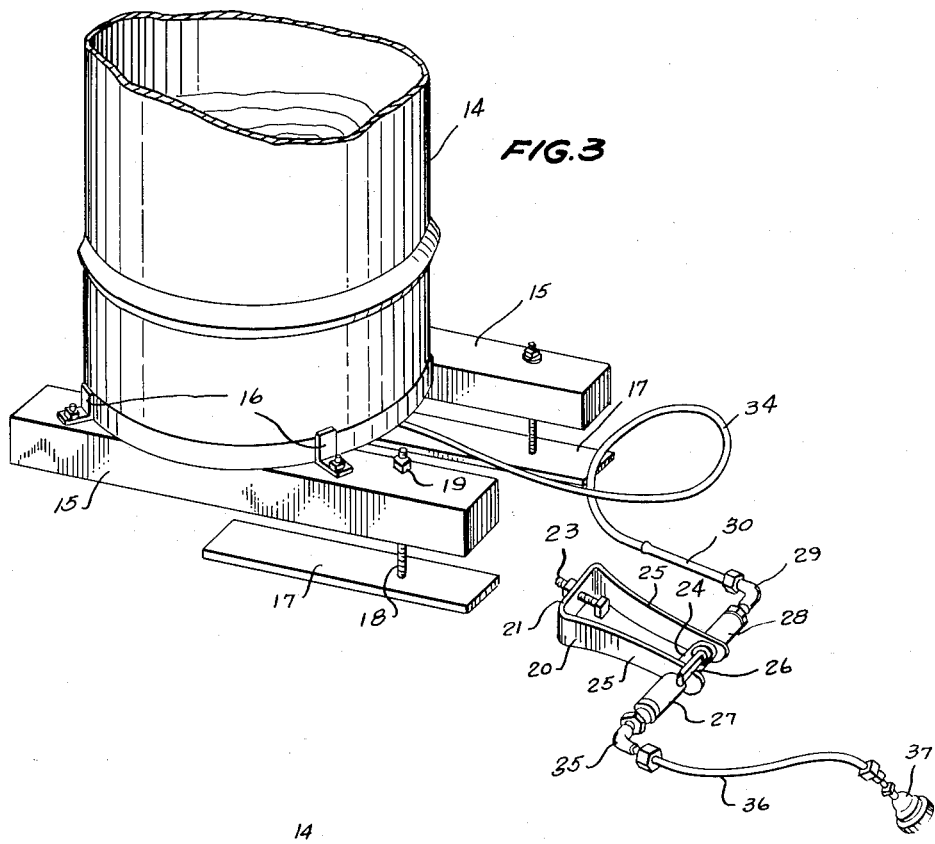
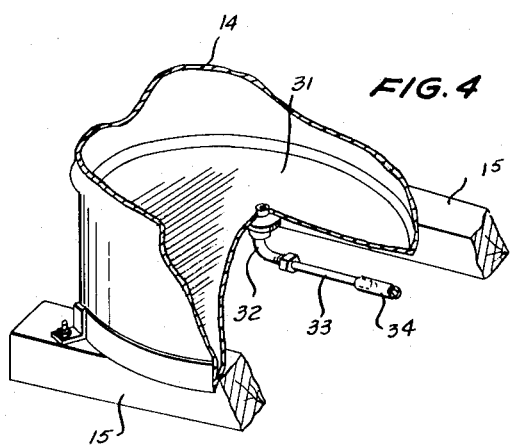
INVENTOR.
JAMES G. GIBSON
BY
McMorrow, Berman + Davidson
ATTORNEYS

United States Patent Office 2,732,254
Patented Jan. 24, 1956

2,732,254

SPRAY ATTACHMENT FOR A CULTIVATOR

James G. Gibson, Lowrys, S. C.

Application July 30, 1954, Serial No. 446,840

2 Claims. (Cl. 299—30)

This invention relates to spray devices, and more particularly to an improved spray attachment for use on a tractor-drawn cultivator for spraying plants with liquid such as insecticides, fungicides, plant foods, and the like.

A main object of the invention is to provide a novel and improved liquid spray attachment for use on a tractor-drawn cultivator, said attachment being simple in construction, being easy to install on the cultivator, and involving no moving parts.

A further object of the invention is to provide an improved spray attachment for a cultivator, said attachment being inexpensive to fabricate, requiring no pumping mechanism, being economical in the use of the liquid material being sprayed, being arranged so that the spraying action occurs simultaneously with the operation of the cultivator, and being further arranged so that the spray nozzle thereof may be readily positioned for the most efficient spray action thereof with respect to the plants being treated.

A still further object of the invention is to provide an improved spray attachment for a cultivator which is relatively compact in size, which is durable in construction and which is provided with control means for regulating the operation thereof and arranged so that the spray device may be turned on or off by the operator of the cultivator without interfering with the cultivating procedure.

Further objects and advantages of the invention will become apparent from the following description and claims, and from the accompanying drawings, wherein:

Figure 3 is an enlarged fragmentary perspective view of the spray attachment employed in Figures 1 and 2; and Figure 4 is a fragmentary perspective view of the bottom portion of the liquid tank employed with the attachment of Figures 1 to 3, showing the manner in which the outlet conduit is connected to the bottom wall of the tank.

Figure 1:
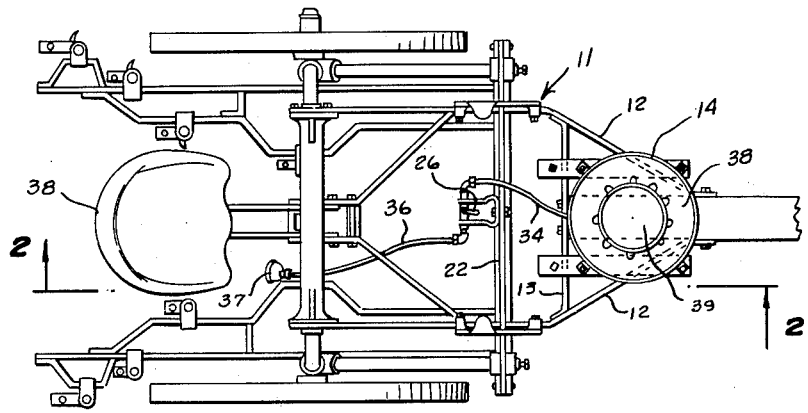
Figure 1 is a top plan view of a conventional cultivator provided with an improved liquid spray attachment constructed in accordance with the present invention.

Referring to the drawings, 11 designates generally a conventional cultivator, for example a cultivator of the tractor-drawn type which is provided with the usual frame, said frame including a forward portion having the forwardly convergent side bars 12, 12 and the transverse cross bar 13 rigidly secured to the convergent bars 12, 12.

Designated at 14 is a vertical tank adapted to contain spray liquid, said tank being mounted on a pair of parallel longitudinally extending base bars 15, 15, the bottom portion of the tank being secured to the base bars in any suitable manner, as by being secured by the angle brackets 16 provided on the bars 15, as shown in Figure 3.

The bars 15 are adapted to be supported on the side bars 12, 12 and the transverse cross bar 13, in the manner shown in Figure 1, each bar 15 being secured to the bars 12 and 13 by a resilient clamping plate 17 secured to the forward portion of the bar 15 by a vertical bolt 18, as shown in Figure 3, the resilient clamping plate 17 underlying the bar 13 and the associated side bar 12 and clampingly engaging the bottom edges of said bars 12 and 13 responsive to the tightening of the clamping nut 19 provided on the associated fastening bolt 18.

Designated at 20 is a U-shaped bracket member whose bight portion 21 is secured to a transverse member 22 of the cultivator frame, as by a fastening bolt 23. Designated at 24 is a control valve which is secured between the arms 25, 25 of the bracket 21, the control valve 24 being provided with the operating handle 26. As shown in Figure 3, the opposite sides of the valve 24 are connected to the respective conduit fittings 27 and 28 located on the outer sides of the arms 25, 25 of bracket 21.

Connected to the conduit fitting 28 is the elbow member 29 to which is connected a short conduit 30. Connected to the bottom wall 31 of the liquid tank 14 is an elbow fitting 32, said elbow fitting making a rigid connection with the bottom wall 31. Connected to the elbow member 32 is the short rigid conduit 33. Designated at 34 is a flexible conduit, such as a rubber hose, which connects the short rigid conduits 30 and 33.

Figure 2:
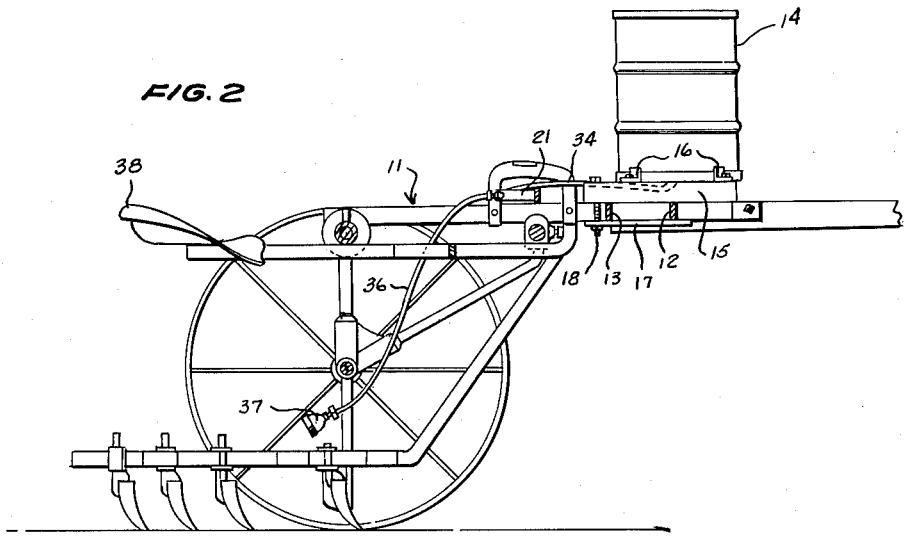
Figure 2 is a vertical cross sectional view taken on line 2—2 of Figure 1.

Connected to the conduit fitting 27 is an elbow conduit 35. Connected to the elbow conduit 35 is a malleable conduit 36, such as a length of copper tubing. Designated at 37 is a spray nozzle which is connected to the end of the malleable conduit 36, the malleable conduit 36 extending downwardly and rearwardly from the bracket 21, as shown in Figure 2.

Since the conduit 36 is of malleable material, the spray nozzle 37 may be readily positioned at a desirable location relative to the row of plants to be sprayed, the nozzle 37 remaining in its adjusted position after the malleable conduit 36 has been thus initially adjusted.

As shown in Figure 1, the valve control handle 26 is located only a short distance forwardly of the operator's seat 38, whereby the handle 26 is in easy reach of the operator, allowing the spray to be turned on and off by the operator without requiring the cessation of the cultivating procedure.

In operation, the liquid feeds by gravity from the tank 14 through the conduit 34 and through the valve 24 to the conduit 36, the liquid being discharged from the spray nozzle 37 onto the plants, the spray nozzle being located sufficiently close to the plants to prevent waste of the liquid and to minimize vaporization thereof. When the operator desires to terminate the spraying action he merely reaches forwardly and manipulates the valve handle 26 to close the valve 24.

The top of the tank 14 provided with the inwardly extending annular flange portion 38, the tank having the cover 39 which engages the rim of the annular flange portion 38. The annular flange portion 38 is of substantial width to prevent loss of the liquid by splashing when the cover 39 is removed from the tank.

While a specific embodiment of an improved spray attachment for a cultivator has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a cultivator, a spray attachment comprising a vertical tank adapted to contain spray liquid, a pair of base bars secured to the bottom of the tank and arranged to be supported on the frame of the cultivator, respective clamping plates arranged below and parallel to the base bars, bolts connecting said clamping plates to said base bars, said clamping plates being engageable with the cultivator frame for clampingly securing said base bars to the cultivator frame, a horizontal U-shaped bracket member, means securing the bight portion of said bracket member to the cultivator frame, a control valve mounted on said bracket member between the arms thereof, a sprinkler head, a downwardly and rearwardly extending malleable conduit connected between one side of said control valve and said sprinkler head, and an additional conduit connected between the bottom of said tank and the other side of said valve, whereby discharge of liquid from said sprinkler head may be controlled by said valve.

2. In a cultivator, a spray attachment comprising a vertical tank adapted to contain spray liquid, a pair of base bars secured to the bottom of the tank and arranged to be supported on the frame of the cultivator, respective clamping plates arranged below and parallel to the base bars, bolts connecting said clamping plates to said base bars, said clamping plates being engageable with the cultivator frame for clampingly securing said base bars to the cultivator frame, a horizontal U-shaped bracket member having parallel, longitudinally extending arms and a bight portion connecting said arms, means securing the bight portion of said bracket member to the cultivator frame, horizontal, oppositely directed, rigid conduit fittings on the outer sides of the arms of said bracket member, a horizontally arranged control valve mounted on said bracket member between the arms thereof and connected between said conduit fittings, a sprinkler head, a downwardly and rearwardly extending malleable conduit connected between one of said conduit fittings and said sprinkler head, and a flexible additional conduit connected between the bottom of said tank and the other conduit fitting, whereby discharge of liquid from said sprinkler head may be controlled by said valve.

References Cited in the file of this patent

UNITED STATES PATENTS

| | | |
|---|---|---|
| 599,938 | Jones | Mar. 1, 1898 |
| 1,258,193 | Cook | Mar. 5, 1918 |
| 1,656,171 | Cox | Jan. 17, 1928 |
| 1,678,061 | Fowler | July 24, 1928 |

FOREIGN PATENTS

| | | |
|---|---|---|
| 287,992 | Great Britain | Apr. 5, 1928 |